United States Patent
Ranjan et al.

(10) Patent No.: US 12,255,946 B2
(45) Date of Patent: Mar. 18, 2025

(54) SCREEN VIEWERSHIP REFLECTION AND LATENCY

(71) Applicant: International Business Machines Corporation, Armonk, NY (US)

(72) Inventors: Paritosh Ranjan, Kolkata (IN); Bhubaneswar Padhan, Kolkata (IN); Prodip Roy, Kolkata (IN); Prosanta Saha, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/325,198

(22) Filed: May 30, 2023

(65) Prior Publication Data

US 2024/0406245 A1    Dec. 5, 2024

(51) Int. Cl.
| | |
|---|---|
| *H04L 65/80* | (2022.01) |
| *G06F 3/14* | (2006.01) |
| *G06T 11/60* | (2006.01) |
| *H04L 65/1089* | (2022.01) |

(52) U.S. Cl.
CPC ............ *H04L 65/80* (2013.01); *G06F 3/1454* (2013.01); *G06T 11/60* (2013.01); *H04L 65/1089* (2013.01); *G06T 2200/24* (2013.01)

(58) Field of Classification Search
CPC ... H04L 65/80; H04L 65/1089; G06F 3/1454; G06T 11/60; G06T 2200/24
See application file for complete search history.

(56) References Cited

U.S. PATENT DOCUMENTS

| | | | | |
|---|---|---|---|---|
| 5,880,731 A | * | 3/1999 | Liles ..................... | G06F 3/0481 345/473 |
| 6,014,136 A | * | 1/2000 | Ogasawara ......... | H04L 12/1827 709/205 |
| 6,760,410 B1 | * | 7/2004 | Lee ..................... | H04M 1/2473 379/915 |

(Continued)

OTHER PUBLICATIONS

Archibald et al., "Using Zoom Videoconferencing for Qualitative Data Collection: Perceptions and Experiences of Researchers and Participants", International Journal of Qualitative Methods, vol. 18, Sage, Jul. 19, 2019, 8 Pages.

(Continued)

*Primary Examiner* — Nicholas Augustine
(74) *Attorney, Agent, or Firm* — Michael O'Keefe (57) ABSTRACT

According to one embodiment, a method, computer system, and computer program product for screen sharing latency detection is provided. The embodiment may include detecting an initiation of a screen sharing session during a web conference. The embodiment may further include adding a timestamp to one or more frames of a shared screen during the screen sharing session. The embodiment may also include transmitting the one or more frames from a sharing participant to a viewing participant during the screen sharing session. The embodiment may further include calculating a time delay between the transmission and a display of the one or more frames on a graphical user interface of the viewing participant. The embodiment may also include displaying the time delay and a frame of the one or more frames corresponding to the time delay on a graphical user interface of the sharing participant.

15 Claims, 4 Drawing Sheets

(56) References Cited

U.S. PATENT DOCUMENTS

| | | | | |
|---|---|---|---|---|
| 7,006,881 | B1* | 2/2006 | Hoffberg | G06V 40/103 |
| | | | | 709/200 |
| 7,219,302 | B1* | 5/2007 | O'Shaughnessy | G06F 3/04817 |
| | | | | 715/752 |
| 7,362,349 | B2* | 4/2008 | Nelson | H04N 7/147 |
| | | | | 348/14.09 |
| 7,752,553 | B2* | 7/2010 | Pennington | G06Q 10/10 |
| | | | | 715/201 |
| 7,814,155 | B2* | 10/2010 | Buchheit | G06F 3/0482 |
| | | | | 709/206 |
| 8,032,470 | B1* | 10/2011 | Heidenreich | G06N 5/04 |
| | | | | 706/45 |
| 8,538,895 | B2* | 9/2013 | Appelman | G06Q 50/01 |
| | | | | 705/319 |
| 8,677,252 | B2 | 3/2014 | Christiansen | |
| 10,757,148 | B2* | 8/2020 | Nelson | H04L 65/4015 |
| 10,798,140 | B1* | 10/2020 | Mercier | H04L 65/612 |
| 11,082,661 | B1* | 8/2021 | Pollefeys | H04N 7/15 |
| 2001/0048449 | A1* | 12/2001 | Baker | H04L 12/1818 |
| | | | | 709/204 |
| 2002/0059098 | A1* | 5/2002 | Sazawa | G06Q 30/0601 |
| | | | | 705/26.1 |
| 2002/0123359 | A1* | 9/2002 | Wei | H04L 67/04 |
| | | | | 455/414.4 |
| 2002/0130904 | A1* | 9/2002 | Becker | G06F 3/0481 |
| | | | | 715/753 |
| 2003/0030670 | A1* | 2/2003 | Duarte | G06Q 10/10 |
| | | | | 715/758 |
| 2003/0065721 | A1* | 4/2003 | Roskind | H04L 51/04 |
| | | | | 709/204 |
| 2003/0088623 | A1* | 5/2003 | Kusuda | H04L 51/04 |
| | | | | 709/204 |
| 2003/0090518 | A1* | 5/2003 | Chien | H04M 3/42382 |
| | | | | 715/758 |
| 2003/0105815 | A1* | 6/2003 | Gusler | H04L 51/04 |
| | | | | 709/224 |
| 2003/0187925 | A1* | 10/2003 | Inala | G06F 21/41 |
| | | | | 709/204 |
| 2004/0078446 | A1* | 4/2004 | Daniell | H04L 69/08 |
| | | | | 709/204 |
| 2005/0114789 | A1* | 5/2005 | Chang | G06F 3/0481 |
| | | | | 715/810 |
| 2005/0204306 | A1* | 9/2005 | Kawahara | G06F 3/0481 |
| | | | | 715/767 |
| 2005/0210181 | A1* | 9/2005 | Depke | G06F 3/04842 |
| | | | | 711/100 |
| 2006/0031772 | A1* | 2/2006 | Valeski | G06F 3/0481 |
| | | | | 715/751 |
| 2008/0040683 | A1* | 2/2008 | Walsh | G06F 3/04855 |
| | | | | 715/781 |
| 2008/0140523 | A1* | 6/2008 | Mahoney | G11B 27/105 |
| | | | | 705/26.1 |
| 2008/0201638 | A1* | 8/2008 | Nair | H04W 4/029 |
| | | | | 715/706 |
| 2008/0209339 | A1* | 8/2008 | Macadaan | G06Q 30/0271 |
| | | | | 715/745 |
| 2008/0209351 | A1* | 8/2008 | Macadaan | G06F 16/9535 |
| | | | | 715/762 |
| 2009/0063995 | A1* | 3/2009 | Baron | H04N 7/17318 |
| | | | | 715/753 |
| 2009/0265487 | A1 | 10/2009 | Zhang | |
| 2009/0313299 | A1* | 12/2009 | Bonev | G06F 16/285 |
| 2010/0149565 | A1* | 6/2010 | Mori | B65H 33/00 |
| | | | | 358/1.9 |
| 2010/0205541 | A1* | 8/2010 | Rapaport | G06Q 30/02 |
| | | | | 715/753 |
| 2010/0251177 | A1* | 9/2010 | Geppert | H04M 3/563 |
| | | | | 709/206 |
| 2011/0154220 | A1* | 6/2011 | Chunilal | G06F 16/48 |
| | | | | 715/751 |
| 2011/0271205 | A1* | 11/2011 | Jones | H04L 12/1822 |
| | | | | 715/753 |
| 2012/0304230 | A1* | 11/2012 | Harwell | H04N 21/4126 |
| | | | | 725/39 |
| 2013/0151976 | A1 | 6/2013 | Bhogal | |
| 2013/0182063 | A1 | 7/2013 | Jaiswal | |
| 2013/0198296 | A1* | 8/2013 | Roy | G06Q 10/107 |
| | | | | 709/206 |
| 2013/0216206 | A1* | 8/2013 | Dubin | G11B 27/031 |
| | | | | 386/282 |
| 2014/0047074 | A1* | 2/2014 | Chung | H04W 4/21 |
| | | | | 709/219 |
| 2014/0229888 | A1* | 8/2014 | Ko | G06F 3/04842 |
| | | | | 715/783 |
| 2014/0310347 | A1 | 10/2014 | Krishnan | |
| 2014/0344675 | A1* | 11/2014 | Chang | G06F 3/0482 |
| | | | | 715/244 |
| 2016/0357495 | A1 | 12/2016 | Moorjani | |
| 2017/0302795 | A1* | 10/2017 | Wolzien | H04L 65/80 |
| 2019/0108578 | A1* | 4/2019 | Spivack | G09B 5/065 |
| 2019/0273767 | A1* | 9/2019 | Nelson | H04M 7/0027 |
| 2019/0318743 | A1* | 10/2019 | Reshef | G10L 25/78 |
| 2020/0264829 | A1* | 8/2020 | Taguchi | G06F 3/04855 |
| 2020/0403893 | A1* | 12/2020 | Son | H04N 21/242 |
| 2022/0253268 | A1 | 8/2022 | Deole | |
| 2022/0272134 | A1 | 8/2022 | Jain | |
| 2023/0260520 | A1* | 8/2023 | Medalion | H04L 12/1831 |
| | | | | 704/232 |

OTHER PUBLICATIONS

Authors et al.: Disclosed Anonymously, "Screen-Sharing Confirmation", An IP.com Prior Art Database Technical Disclosure, IP.com No. IPCOM000271541D, IP.com Electronic Publication Date: Jan. 3, 2023, 6 Pages.

* cited by examiner

SCREEN VIEWERSHIP REFLECTION AND LATENCY

BACKGROUND

The present invention relates generally to the field of computing, and more particularly to web conferencing.

A communication platform relates to any software-based system that enables a user to communicate or correspond with other individuals regardless of the distance between the physical locations of those individuals. Although some communication platforms allow for a single form of communication, such as typed text, audio, or video communication, other communication platforms may allow multiple forms of communication; sometimes concurrently.

Web conferencing, including but not limited to audio conferencing and video conferencing, may relate to any communication between two or more individuals over a network, such as the Internet, where the participating members utilize audio and/or video streams. Web conferencing allows for a dynamic interface between users in separate locations to efficiently communicate as if they were in person by allowing face-to-face interactions and the sharing of files between participating users. Popular web conferencing applications include Zoom® (Zoom and all Zoom-based trademarks and logos are trademarks or registered trademarks of Zoom Video Communications Inc. and/or its affiliates), Webex® (Webex and all Webex-based trademarks and logos are trademarks or registered trademarks of Webex Communications, Inc. and/or its affiliates), GoToMeeting® (GoToMeeting and all GoToMeeting-based trademarks and logos are trademarks or registered trademarks of Citrix Online, LLC, and/or its affiliates), and FaceTime® (Facetime and all Facetime-based trademarks and logos are trademarks or registered trademarks of Apple Inc. and/or its affiliates) among others.

SUMMARY

According to one embodiment, a method, computer system, and computer program product for screen sharing latency detection is provided. The embodiment may include detecting an initiation of a screen sharing session during a web conference. The embodiment may further include adding a timestamp to one or more frames of a shared screen during the screen sharing session. The embodiment may also include transmitting the one or more frames from a sharing participant to a viewing participant during the screen sharing session. The embodiment may further include calculating a time delay between the transmission and a display of the one or more frames on a graphical user interface of the viewing participant. The embodiment may also include displaying the time delay and a frame of the one or more frames corresponding to the time delay on a graphical user interface of the sharing participant.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to screen sharing latency detection. The following described exemplary embodiments provide a system, method, and program product to, among other things, provide latency information for each participant in a web conference to a screen sharing participant. Therefore, the present embodiment has the capacity to improve the technical field of web conferencing by enabling a screen sharing participant to act accordingly during a screen sharing session based on real time latency metrics for each participant.

As previously described, web conferencing, including but not limited to audio conferencing and video conferencing, may relate to any communication between two or more individuals over a network, such as the Internet, where the participating members utilize audio and/or video streams. Web conferencing allows for a dynamic interface between users in separate locations to efficiently communicate as if they were in person by allowing face-to-face interactions and the sharing of files between participating users. Popular web conferencing applications include Zoom®, Webex®, GoToMeeting®, and FaceTime® among others.

During screen sharing sessions in a web conference, delays between the time a shared screen is transmitted to viewer participants and when the received transmission of the shared screen is displayed to each viewer participant on their respective device display screen. Furthermore, this delay may vary from participant to participant as latency may vary from network to network between devices. A presenting user sharing their screen to participant users may have no indication that such delays exist, and the presence of such delays may degrade the user experience during a web conference. As such, it may be advantageous to, among other things, provide real time latency insights for observing participants to a presenting participant engaging in a screen sharing session during a web conference.

According to at least one embodiment, a screen sharing latency detection program determine when a user begins a screen sharing session during a web conference and generate a timestamp to images transmitted to each other web conference participant observing the screen share. The screen sharing latency detection program, locally installed on a user device for each observing participant, may determine a calculate latency metrics based on the timestamp for each received image and transmit the latency metrics to the screen sharing latency detection program hosted on a central server or on a user device of the presenting user. The screen sharing latency detection program may then present the latency metrics to the presenting user as a graphical user interface feature that regularly updates on preconfigured intervals.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
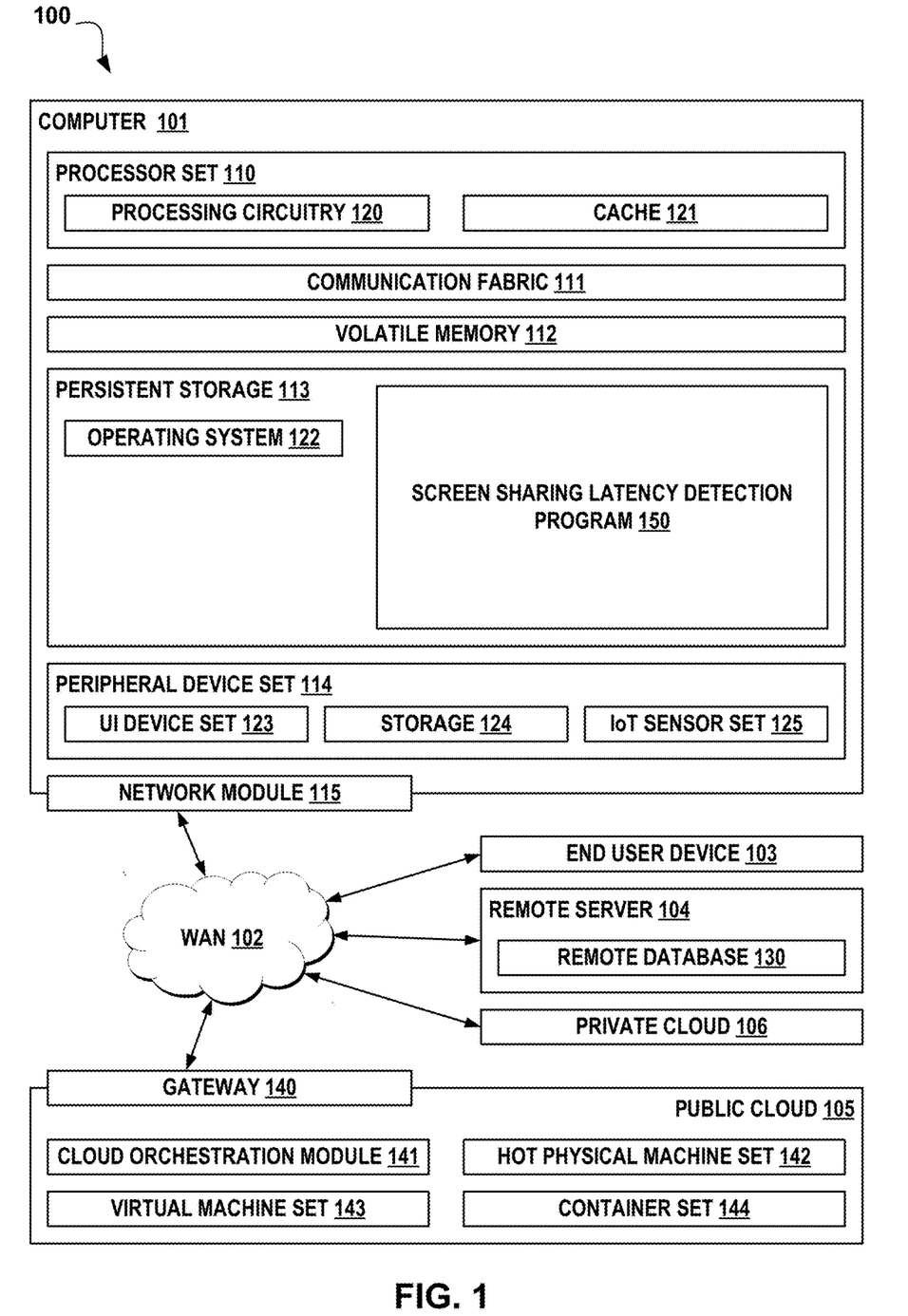
FIG. 1 illustrates an exemplary networked computer environment according to at least one embodiment.

Referring now to FIG. 1, computing environment 100 contains an example of an environment for the execution of at least some of the computer code involved in performing the inventive methods, such as screen sharing latency detection program 150. In addition to screen sharing latency detection program 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and screen sharing latency detection program 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, for illustrative brevity. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in screen sharing latency detection program 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in screen sharing latency detection program 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN 102 and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to at least one embodiment, the screen sharing latency detection program 150 may be capable of determining the initiation of a screen sharing session by a user participating in a web conference, determining latency information for each other participant in the web conference based on a timestamp attached to each frame indicative of the time at which each frame was transmitted being compared to a time at which the frame was received, and displaying the latency information on a graphical user interface for observation by the screen sharing user.

Additionally, prior to initially performing any actions, the screen sharing latency detection program 150 may perform an opt-in procedure. The opt-in procedure may include a notification of the data the screen sharing latency detection program 150 may capture and the purpose for which that data may be utilized by the screen sharing latency detection program 150 during data gathering and operation. Furthermore, notwithstanding depiction in computer 101, the screen sharing latency detection program 150 may be stored in and/or executed by, individually or in any combination, end user device 103, remote server 104, public cloud 105, and private cloud 106. The screen sharing latency detection method is explained in more detail below with respect to FIGS. 2, 3A, and 3B.

Figure 2:
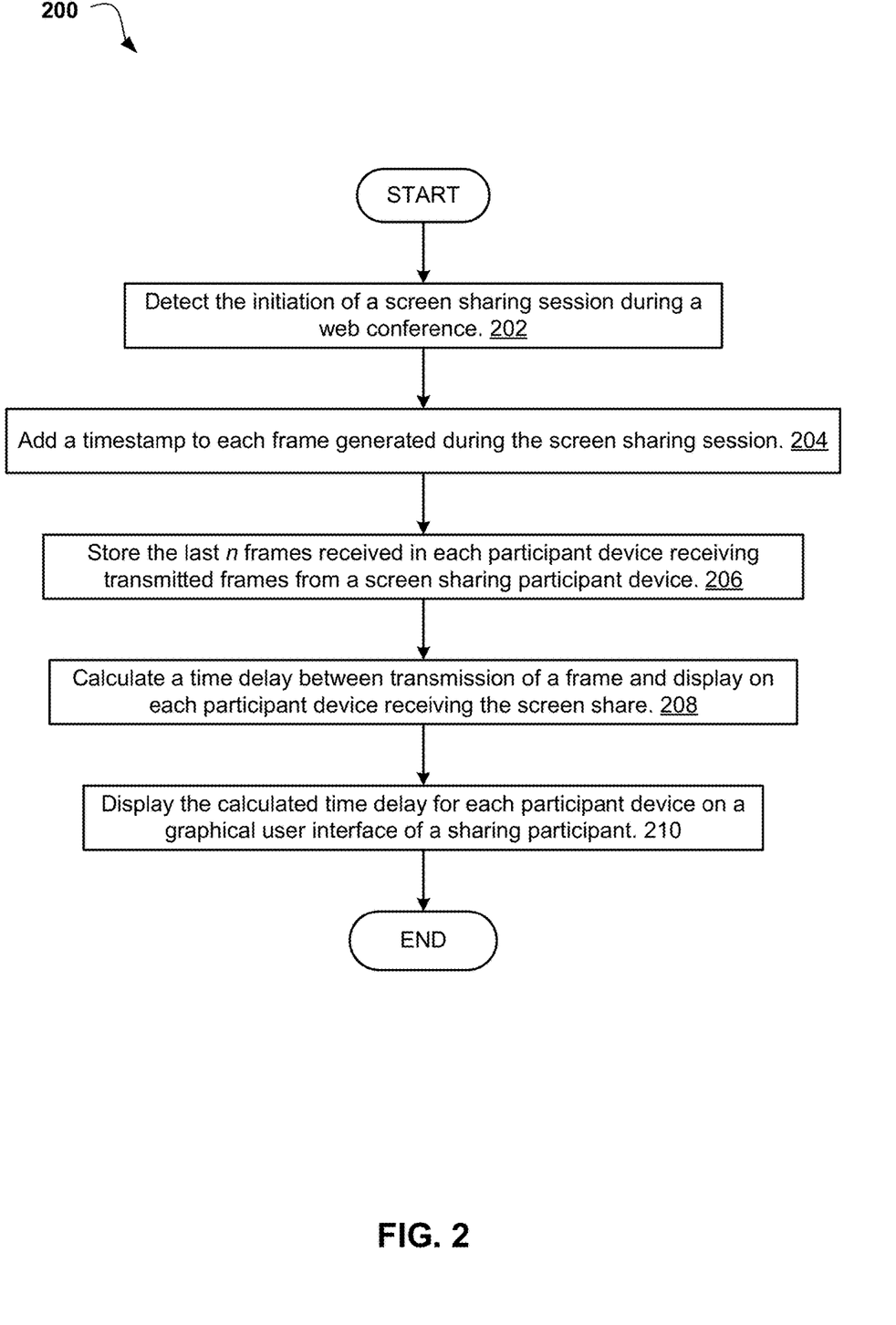
FIG. 2 illustrates an operational flowchart for a screen sharing delay detection process according to at least one embodiment.

Referring now to FIG. 2, an operational flowchart illustrating a screen sharing latency detection process 200 is depicted according to at least one embodiment. At 202, the screen sharing latency detection program 150 detects the initiation of a screen sharing session during a web conference. During normal operation of a web conferencing program, a user may wish to share their screen with the other web conference participants for various reasons. The screen sharing latency detection program 150 may use the initiation of the screen sharing session as a trigger event for its own operation process and, therefore, may monitor user interactions with a graphical user interface of the web conferencing program for user interactions that begin a screen sharing session, such as a mouse click on a "Share" button.

Then, at 204, the screen sharing latency detection program 150 adds a timestamp to each frame generated during the screen sharing session. Prior to transmitting a frame to each participant viewing the shared screen, the screen sharing latency detection program 150 may add a timestamp as either a watermark or as metadata to the frame being transmitted. In one embodiment, the screen sharing latency detection program 150 may add the timestamp to each frame transmitted. However, in one or more other embodiments, the screen sharing latency detection program 150 may be preconfigured to add the timestamp periodically, such as once a second or once every n frames. The screen sharing latency detection program 150 may be added to the frames as "#ts<meeting-id>-<current-timestamp>" where <meeting-id> is a unique identifier generated by either the web conferencing program or the screen sharing latency detection program 150 to distinguish meetings from each other and where <current-timestamp> is an alphanumeric sequence indicative of the time at which a frame was transmitted from the screen sharing participant to the other participants in the screen sharing session. Prior to transmission of each timestamped frame to the other web conference participants, the screen sharing latency detection program 150 may store the timestamped frames or the information relevant to identifying the timestamp and the frame to which the timestamp corresponds in a local repository, such as storage 124, or in a server repository, such as remote database 130.

Next, at 206, the screen sharing latency detection program 150 stores the last n frames received in each participant device receiving transmitted frames from a screen sharing participant device. Upon receiving the timestamped frames through normal operation of the web conferencing program during a screen sharing session, the screen sharing latency detection program 150 may store the frames, or a subset (e.g., less than all or a portion of a single frame) of the frames, in a local repository, such as storage 124. The screen sharing latency detection program 150 may store a preconfigured number, n, of frames or seconds worth of frames in local storage. For example, the screen sharing latency detection program 150 may store the previous 24 frames in local storage or one second worth of frames. The screen sharing latency detection program 150 may allow a user or an administrator to modify the value of n in a settings menu. Furthermore, the screen sharing latency detection program 150 may store the last n frames locally in the presenting user's device prior to transmission of each frame to the other web conference participants.

Then, at 208, the screen sharing latency detection program 150 calculates a time delay between transmission of a frame and display of the frame on each participant device receiving the screen share. The screen sharing latency detection program 150 stored on each participant's computing device, such as computer 101, may extract the timestamp from either the watermark or the metadata in order to begin calculation of the latency information. If the timestamp information is stored as a watermark on each transmitted frame, the screen sharing latency detection program 150 may apply image recognition technology, such as optical character recognition or a cognitive neural network, on the device display screen currently displaying the sharing participant's shared screen to capture the timestamp information. If the timestamp information is stored as metadata on each transmitted frame, the screen sharing latency detection program 150 may extract timestamp information from the metadata of the currently displayed frame. For example, the screen sharing latency detection program 150 may perform an "extract timestamp" operation from #ts<meeting-id>-<timestamp> to capture the timestamp.

Furthermore, the screen sharing latency detection program 150 may capture timestamp information related to a time of display for each frame on the user device display screen of the participant user. The screen sharing latency detection program 150 may utilize this timestamp information when calculating the latency delay for a web conference participant.

Upon extracting the timestamp information from the displayed frame, the screen sharing latency detection program 150 may transmit the timestamp information related to the transmission from the screen sharing user and the timestamp information related to the participant user's receipt of the frame to a central server, such as remote server 104 or private cloud 106, as a representational state transfer (REST) application programming interface (API). For example, the screen sharing latency detection program 150 may generate a mapping, such as <frame-received-timestamp>: <attendee's-current-timestamp>: <attendee-id>, that is then transferred to the central server hosting the web conference.

Thereafter, the screen sharing latency detection program 150, in the central server, may calculate the screen delay for a meeting participant observing the screen sharing session. The screen sharing latency detection program 150 may calculate the screen for a meeting participant as the delay between the transmission of a frame and the display of that frame on the participant's display screen. As such, the screen sharing latency detection program 150 may calculate a unique delay for each participant since each participant may have different factors relating to their connection to the central server and/or the screen sharing participant's user device. The screen sharing latency detection program 150 may iteratively update the delay calculation in real time or based on a preconfigured schedule.

Next, at 210, the screen sharing latency detection program 150 displays the calculated time delay for each participant device on a graphical user interface of a sharing participant. Once the screen sharing latency detection program 150 calculates a time delay for a participant viewing the screen sharing session, the screen sharing latency detection program 150 may display the time delay calculation juxtaposed to the participant's name or avatar on a user interface for the web conferencing program. For example, if a participant's connection status exhibits a 200 millisecond time delay, the screen sharing latency detection program 150 may display "200 ms" beside the participant's name on the screen of the presenting participant and, in at least one embodiment, the other web conference participants.

In one or more other embodiments, the screen sharing latency detection program 150 may also display the real time image being displayed on a participant's display screen on the user interface for the presenting user, and, in one or more embodiments, the other web conference participants, juxtaposed to the participant's name or avatar. For example, the screen sharing latency detection program 150 may calculate a specific participant is experiencing a three second delay in latency between when an image is transmitted from the presenting participant to when the image is presented to the display screen of the specific participant. As such, the screen sharing latency detection program 150 may display an image on the display screen for the presenting user that is three seconds delayed from their own screen to duplicate the specific user's screen for the presenting user as a visual indication as to what the specific user is observing due to latency. The screen sharing latency detection program 150 may utilize the transmitted images stored locally in the computing device of the presenting user to display the image on the display screen for the presenting user that is indicative and/or replicative of the image presented on a participant's display screen when accounting for the calculated time delay.

Figure 3A:
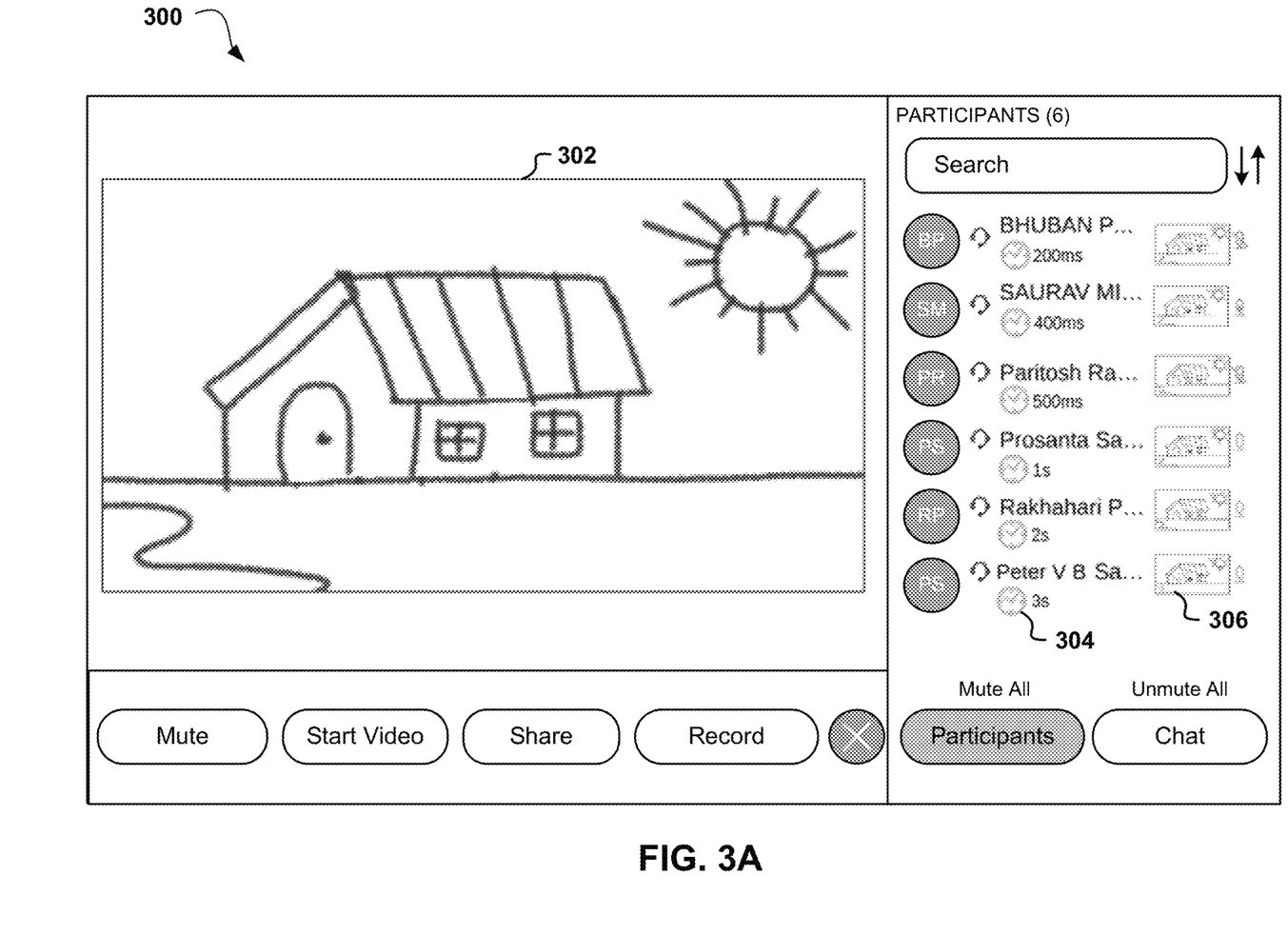
FIGS. 3A and 3B illustrate an exemplary block diagram of a screen sharing session where screen sharing latency detection is enabled according to at least one embodiment.
Figure 3B:
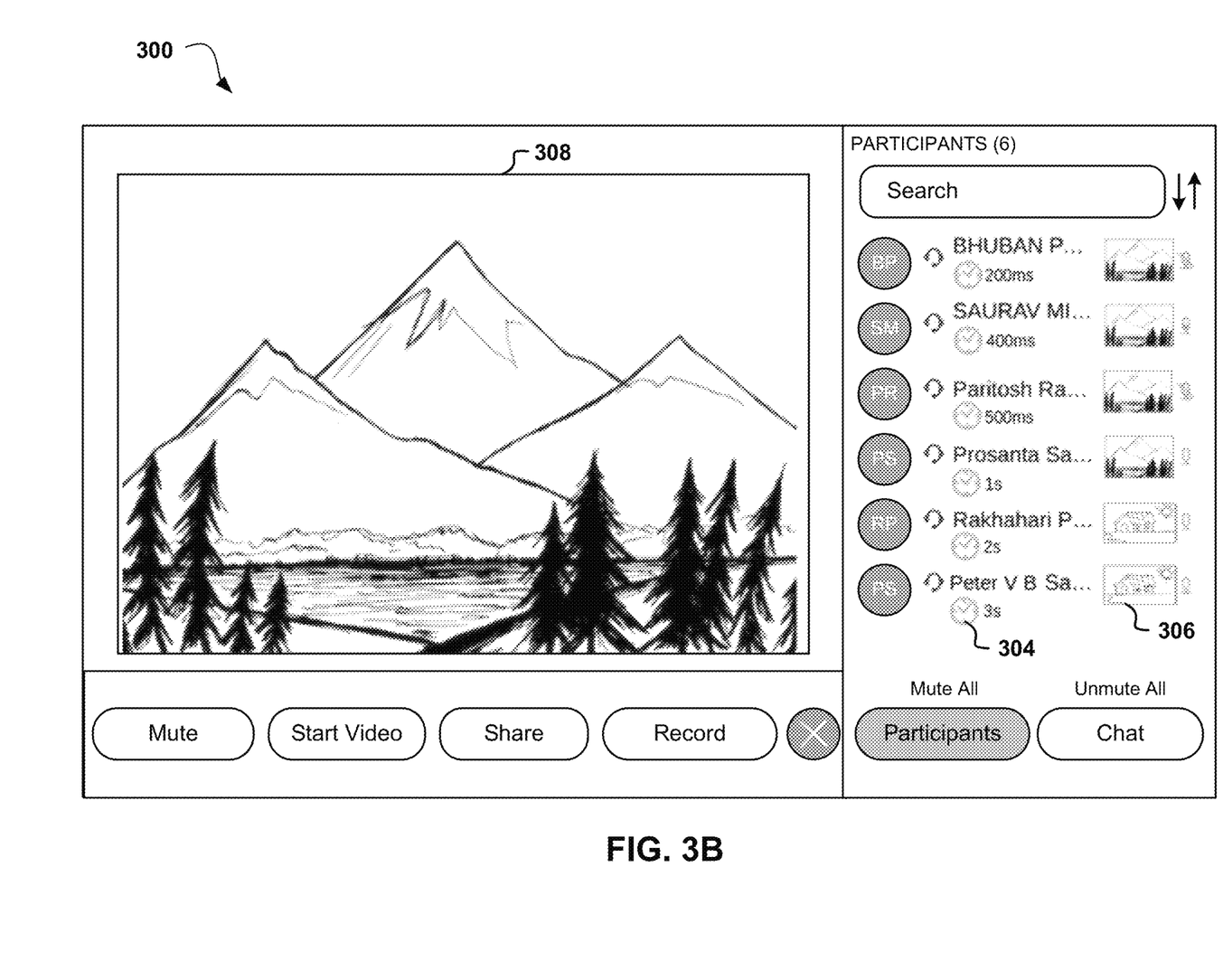

Referring now to FIGS. 3A and 3B, exemplary block diagrams of a screen sharing session 300 where screen sharing latency detection is enabled is depicted according to at least one embodiment. In FIGS. 3A, during the screen sharing session 300, the screen sharing latency detection program 150 may share a first image 302 with the other participants in a web conference. Initially, the screen sharing latency detection program 150 may calculate a latency for the shared image to transmit and display on the display screen for each participant in the web conference. For example, the screen sharing latency detection program 150 may calculate latency time 304 for a specific user as three seconds. Additionally, the screen sharing latency detection program 150 may display a reference image that duplicates the image currently displayed on the device display screen for each user taking into account the latency experienced by each user. For example, the previously described user experiencing the three second latency value may have a reference image 306 that is the same as that shared by the presenting user since the screen sharing session just began or because the three second latency delay has already elapsed.

In FIG. 3B, the presenting user may proceed with their presentation and move to a next image in their presentation, such as second image 308. Immediately after the user changes images to display a second image 308, the reference images for each other participant will remain on the previous image since the latency period for each other participant has not elapsed. However, as time progresses and the latency period for each participant elapses, the reference images may change from first image 302 to second image 308. For example, after one and a half second have elapsed from the presenting user changing from first image 302 to second image 308, four of the six participating users will have their calculated latency, or delay, periods elapse, and the reference images displayed beside those participants' names will change to the second image 308. However, for participants with a latency period longer than one and a half seconds, the reference images will remain the first image 302. Therefore, the calculated and displayed latency times, such as latency time 304, and displayed reference images, such as reference image 306, may be accurate indications to the presenting user as to the currently displayed image on the user device display screen for each participant. Knowing the currently displayed image on the user device display screen for each participant may allow the presenting user to adjust their presentation accordingly until each participant's display screen displays the appropriate image of the presentation thereby providing metrics for web conference screen sharing session previously unavailable.

It may be appreciated that FIGS. 2, 3A, and 3B provide only an illustration of one implementation and do not imply any limitations with regard to how different embodiments may be implemented. Many modifications to the depicted environments may be made based on design and implementation requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the method comprising:
    detecting an initiation of a screen sharing session during a web conference;
    adding a timestamp, as metadata, to one or more frames of a shared screen during the screen sharing session;
    transmitting the one or more frames from a sharing participant to a viewing participant during the screen sharing session;
    calculating a time delay between the transmission and a display of the one or more frames on a graphical user interface of the viewing participant based on a timestamp extraction operation that extracts the metadata associated with the added timestamp; and
    displaying the calculated time delay and a frame of the one or more frames corresponding to the time delay on a graphical user interface of the sharing participant adjacent to a user name or an avatar associated with the viewing participant to whom the time delay corresponds.

2. The method of claim 1, further comprising:
    storing a subset of the one or more frames locally on a user device associated with the sharing participant and the viewing participant.

3. The method of claim 2, wherein the frame is a reference image corresponding to the time delay experienced by the viewing participant, and wherein the frame is retrieved from the subset.

4. The method of claim 1, wherein the calculating further comprises:
    extracting timestamp information relating to the transmission of the one or more frames;
    transmitting the timestamp information relating to the transmission and timestamp information relating to the display to a central server as a representational state transfer application programming interface; and
    calculating the time delay as a difference between the timestamp information relating to the transmission and timestamp information relating to the display.

5. The method of claim 1, further comprising:
    in response to the timestamp being stored as a watermark, extracting timestamp information relating to the transmission from the one or more frames using optical character recognition or a cognitive neural network.

6. A computer system, the computer system comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    detecting an initiation of a screen sharing session during a web conference;
    adding a timestamp to one or more frames of a shared screen during the screen sharing session;
    transmitting the one or more frames from a sharing participant to a viewing participant during the screen sharing session;
    calculating a time delay between the transmission and a display of the one or more frames on a graphical user interface of the viewing participant based on a timestamp extraction operation that extracts the metadata associated with the added timestamp; and
    displaying the calculated time delay and a frame of the one or more frames corresponding to the time delay on a graphical user interface of the sharing participant adjacent to a user name or an avatar associated with the viewing participant to whom the time delay corresponds.

7. The computer system of claim 6, wherein the method further comprises:
    storing a subset of the one or more frames locally on a user device associated with the sharing participant and the viewing participant.

8. The computer system of claim 7, wherein the frame is a reference image corresponding to the time delay experienced by the viewing participant, and wherein the frame is retrieved from the subset.

9. The computer system of claim 6, wherein the calculating further comprises:
    extracting timestamp information relating to the transmission of the one or more frames;
    transmitting the timestamp information relating to the transmission and timestamp information relating to the display to a central server as a representational state transfer application programming interface; and
    calculating the time delay as a difference between the timestamp information relating to the transmission and timestamp information relating to the display.

10. The computer system of claim 6, wherein the method further comprises: in response to the timestamp being stored as a watermark, extracting timestamp information relating to the transmission from the one or more frames using optical character recognition or a cognitive neural network.

11. A computer program product, the computer program product comprising:
    one or more computer-readable tangible storage medium and program instructions stored on at least one of the one or more tangible storage medium, the program instructions executable by a processor capable of performing a method, the method comprising:

detecting an initiation of a screen sharing session during a web conference;

adding a timestamp to one or more frames of a shared screen during the screen sharing session;

transmitting the one or more frames from a sharing participant to a viewing participant during the screen sharing session;

calculating a time delay between the transmission and a display of the one or more frames on a graphical user interface of the viewing participant based on a timestamp extraction operation that extracts the metadata associated with the added timestamp; and displaying the calculated time delay and a frame of the one or more frames corresponding to the time delay on a graphical user interface of the sharing participant adjacent to a user name or an avatar associated with the viewing participant to whom the time delay corresponds.

12. The computer program product of claim 11, further comprising:

storing a subset of the one or more frames locally on a user device associated with the sharing participant and the viewing participant.

13. The computer program product of claim 12, wherein the frame is a reference image corresponding to the time delay experienced by the viewing participant, and wherein the frame is retrieved from the subset.

14. The computer program product of claim 11, wherein the calculating further comprises:

extracting timestamp information relating to the transmission of the one or more frames;

transmitting the timestamp information relating to the transmission and timestamp information relating to the display to a central server as a representational state transfer application programming interface; and calculating the time delay as a difference between the timestamp information relating to the transmission and timestamp information relating to the display.

15. The computer program product of claim 11, further comprising:

in response to the timestamp being stored as a watermark, extracting timestamp information relating to the transmission from the one or more frames using optical character recognition or a cognitive neural network.

\* \* \* \* \*